United States Patent
Kawamura et al.

(10) Patent No.: US 10,073,448 B2
(45) Date of Patent: Sep. 11, 2018

(54) STEERING STABILIZING SYSTEM WITH AUTOMATIC PARAMETER DOWNLOAD FOR A MODEL VEHICLE

(71) Applicant: TRAXXAS LP, McKinney, TX (US)

(72) Inventors: Thomas Michael Kawamura, Plano, TX (US); Wesley Ronald Erhart, McKinney, TX (US); Scott Rollin Michael Schmitz, Lewisville, TX (US)

(73) Assignee: Traxxas, LP, McKinney, TX (US)

( * ) Notice: Subject to any disclaimer, the term of this patent is extended or adjusted under 35 U.S.C. 154(b) by 0 days.

(21) Appl. No.: 15/132,193

(22) Filed: Apr. 18, 2016

(65) Prior Publication Data
US 2016/0306353 A1 Oct. 20, 2016

Related U.S. Application Data

(60) Provisional application No. 62/149,517, filed on Apr. 17, 2015.

(51) Int. Cl.
| | |
|---|---|
| *A63H 30/04* | (2006.01) |
| *G05D 1/00* | (2006.01) |
| *A63H 17/36* | (2006.01) |
| *A63H 17/395* | (2006.01) |
| *G05D 1/02* | (2006.01) |

(52) U.S. Cl.
CPC ........... *G05D 1/0016* (2013.01); *A63H 17/36* (2013.01); *A63H 17/395* (2013.01); *A63H 30/04* (2013.01); *G05D 1/028* (2013.01)

(58) Field of Classification Search
None
See application file for complete search history.

(56) References Cited

U.S. PATENT DOCUMENTS

| | | |
|---|---|---|
| 4,929,949 A | 5/1990 | Yamamoto et al. |
| 5,642,281 A | 6/1997 | Ishida et al. |
| 5,762,554 A | 6/1998 | Siu |

(Continued)

FOREIGN PATENT DOCUMENTS

| | | |
|---|---|---|
| AU | 2014216022 A1 | 9/2014 |
| EP | 2296121 A2 | 3/2011 |

(Continued)

OTHER PUBLICATIONS

Spektrum DX3R Pro User Guide, Aug. 2010.*

(Continued)

*Primary Examiner* — Lail A Kleinman
(74) *Attorney, Agent, or Firm* — Daryl R. Wright; Greg Carr

(57) ABSTRACT

An electronic system for stabilizing steering of a model vehicle may use different settings depending upon the RC model vehicle to be controlled. Different vehicles have different dynamic operation and responses and therefore may require different Electronic Steering Stability (ESS) system "settings". The "settings" may be different "gains", or different "coefficients" used with the control system algorithms. "Settings" may also mean that a completely different control algorithm may be used. For example, a vehicle A may be controlled adequately with a "P" control algorithm, while a vehicle B may require a complete "PID" control algorithm to be implemented.

20 Claims, 7 Drawing Sheets

(56) References Cited

U.S. PATENT DOCUMENTS

| | | |
|---|---|---|
| 6,088,633 A | 7/2000 | Yamamoto |
| 6,241,574 B1 | 6/2001 | Helbing |
| 6,821,184 B1 | 11/2004 | Yeung |
| 7,610,131 B2 | 10/2009 | Kojima |
| 8,154,227 B1 | 4/2012 | Young et al. |
| 8,160,816 B2 | 4/2012 | Kanai et al. |
| 8,818,571 B1 | 8/2014 | Lida et al. |
| 9,043,029 B2 | 5/2015 | Seo |
| 9,320,977 B2 | 4/2016 | Beard et al. |
| 2003/0043053 A1 | 3/2003 | Schuckel |
| 2004/0016294 A1 | 1/2004 | Sugitani et al. |
| 2005/0003735 A1 | 1/2005 | Carter et al. |
| 2005/0222729 A1 | 10/2005 | Sakata |
| 2005/0267661 A1 | 12/2005 | Iwazaki et al. |
| 2006/0052917 A1 | 3/2006 | Schwarzhaupt et al. |
| 2006/0071551 A1 | 4/2006 | Taniguchi et al. |
| 2006/0085111 A1 | 4/2006 | Kojima |
| 2006/0211328 A1 | 9/2006 | Del Castillo |
| 2007/0035412 A1 | 2/2007 | Dvorak et al. |
| 2008/0026671 A1 | 1/2008 | Smith et al. |
| 2008/0167770 A1 | 7/2008 | Macdonald et al. |
| 2008/0251312 A1 | 10/2008 | Goto et al. |
| 2009/0076664 A1 | 3/2009 | McCabe et al. |
| 2009/0099735 A1 | 4/2009 | McCoy et al. |
| 2009/0222168 A1 | 9/2009 | Egenfeldt |
| 2011/0054717 A1 | 3/2011 | Yamauchi et al. |
| 2011/0231050 A1 | 9/2011 | Goulding |
| 2012/0041658 A1 | 2/2012 | Turner |
| 2012/0046856 A1 | 2/2012 | Doi |
| 2012/0088436 A1 | 4/2012 | Grossman |
| 2012/0130593 A1 | 5/2012 | Davis et al. |
| 2012/0179322 A1 | 7/2012 | Hennessy et al. |
| 2012/0259479 A1 | 10/2012 | Yoneta et al. |
| 2013/0122779 A1 | 5/2013 | Doherty |
| 2013/0138266 A1* | 5/2013 | Koike ............ A63H 30/04 701/2 |
| 2013/0172060 A1 | 7/2013 | Keating et al. |
| 2013/0207828 A1 | 8/2013 | Tanaka |
| 2013/0226408 A1 | 8/2013 | Fung et al. |
| 2013/0226409 A1 | 8/2013 | Akiyama et al. |
| 2013/0231814 A1 | 9/2013 | Sarokhan et al. |
| 2014/0012469 A1 | 1/2014 | Kunihiro et al. |
| 2014/0143839 A1 | 5/2014 | Ricci |
| 2014/0312824 A1 | 10/2014 | Beard |
| 2014/0323013 A1 | 10/2014 | Gonzalez-Heydrich et al. |
| 2015/0015376 A1 | 1/2015 | Jenkins |
| 2015/0039350 A1 | 2/2015 | Martin et al. |
| 2015/0057841 A1 | 2/2015 | Hsu et al. |
| 2015/0094880 A1 | 4/2015 | Beard et al. |
| 2015/0103019 A1 | 4/2015 | Young |

FOREIGN PATENT DOCUMENTS

| | | |
|---|---|---|
| GB | 2472786 A | 2/2011 |
| JP | 11078826 A | 3/1999 |
| JP | 2006020652 A | 1/2006 |
| JP | 2009125212 A | 6/2009 |
| WO | WO 90/14980 A1 | 12/1990 |

OTHER PUBLICATIONS

International Search Report and Written Opinion by the ISA/EP, dated Jul. 12, 2016, re PCT International Application No. PCT/US2016/028180.

International Search Report and Written Opinion by the ISA/EP, dated Sep. 5, 2016, re PCT International Application No. PCT/US2016/028175.

Ackerman, Jurgen, et al., "Automatic car steering control bridges over the driver reaction time," Kybernetika, vol. 33, No. 1, 1997, pp. 61-74.

Dunsmoor, Adam et al., "Senior design project—Gyroscopic vehicle stabilization," Northern Illinois University, ELE 492, Apr. 29, 2013, Google date: Aug. 13, 2013, 17 pages, on the Internet at: https://reipooom.files.wordpress.com/2013/08/project-report-2.pdf.

Unknown; Hobby Media blog entry, "HPI Baja 5B D-Box 2 RTR: 2wd buggy in scale 1/5", Mar. 19, 2015, 10 pages, translated from Italian by Google, on the Internet at: http://www.hobbymedia.it/54960/hpi-baja-5b-d-box-2-rtr-buggy-2wd-in-scala-15.

Li, Qiang et al., "Yaw stability control using the fuzzy PID controller for active front steering", High Technology Letters, vol. 16, No. 1, Mar. 2010, pp. 94-98.

Song, Jeonghoon, "Design and comparison of AFS controllers with PID, fuzzy-logic, and sliding-mode controllers," Advances in Mechanical Engineering, vol. 2013, Article IDS 401548, 2013, 13 pages.

Wang, Long et al., "Robustly stabiling PID controllers for car steering systems," Proceedings of the American Control Conference, Philadelphia, PA, Jun. 1998, pp. 41ff.

Wu, Jian et al., "Generalized internal model robust control for active front steering intervention," Chinese Journal of Mechanical Engineering, vol. 28, No. 2, Mar. 2015 (First online: Jan. 30, 2015), 9 pages.

Astrom, Karl Johan et al., "Feedback Systems: An Introduction for Scientists and Engineers," Verson v2.10b (Feb. 22, 2009), Copyright 2009 Princeton University Press, Princeton and Oxford, Chapter 10, pp. 293-314.

Kahveci, Nazli E., "Adaptive Steering Control for Uncertain Vehicle Dynamics with Crosswind Effects and Steering Angle Constraints," Proceedings fo the 2008 IEEE International Conference on Vehicular Electronics and Safety, Columbus, OH, USA, Sep. 22-24, 2008, pp. 162-167.

\* cited by examiner

STEERING STABILIZING SYSTEM WITH AUTOMATIC PARAMETER DOWNLOAD FOR A MODEL VEHICLE

CROSS-REFERENCE TO RELATED APPLICATIONS

This application relates to, and claims the benefit of the filing date of, U.S. provisional patent application Ser. No. 62/149,517 entitled STEERING STABILIZING SYSTEM WITH AUTOMATIC PARAMETER DOWNLOAD FOR A MODEL VEHICLE, filed Apr. 17, 2015, the entire contents of which are incorporated herein by reference for all purposes.

BACKGROUND OF THE INVENTION

Field of the Invention

The present invention relates to model vehicles and, more particularly, to an electronic system for stabilizing the steering of the model vehicle.

Description of the Related Art

For a Radio Controlled (RC) Model Vehicle, the RC Driver controls the vehicle remotely. The RC Driver can only detect the vehicle's motion visually. The RC Driver cannot feel the vehicle's disturbances such as hitting a raised area of earth. The time constants for scaled vehicles are much smaller than the time constants for full sized vehicles. The smaller vehicle responds to disturbances and steering inputs much faster than full sized vehicle.

Different model vehicles may have different physical and dynamic parameters, such as wheelbase (distance separating front and rear wheels), track (distance separating left and right wheels), roll center locations, weight distribution, maximum steering angle, and total mass or weight among the physical parameters, and total engine power, torque, and gear ratios among the dynamic parameters. Because of the physical and dynamic differences between different model vehicles, the electronic steering stability system may operate differently in one vehicle as opposed to another vehicle.

SUMMARY

An electronic system is provided for stabilizing steering of several differing RC model vehicles.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

Electronic steering stability may aid the RC Driver by stabilizing the steering. When the steering stability function is on, the RC Driver can focus on larger steering inputs while an electronic steering stability system responds to disturbances around the RC Driver's steering inputs.

Figure 1:
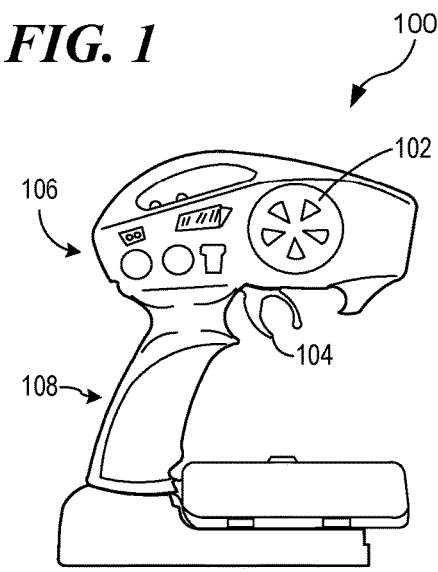
FIG. 1 illustrates a standard RC Controller used for surface model vehicles, such as model cars and model trucks, for example.
Figure 2:
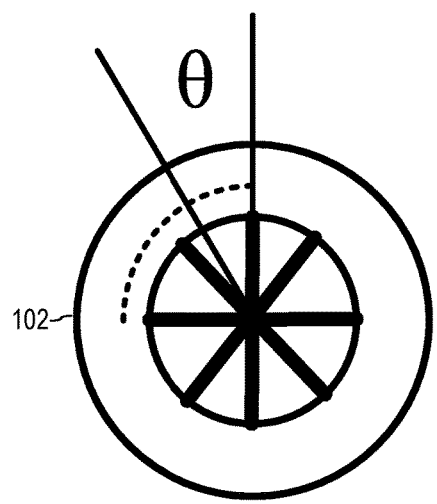
FIG. 2 illustrates the use of a Radio Control (RC) steering control knob (aka steering wheel)
Figure 3:
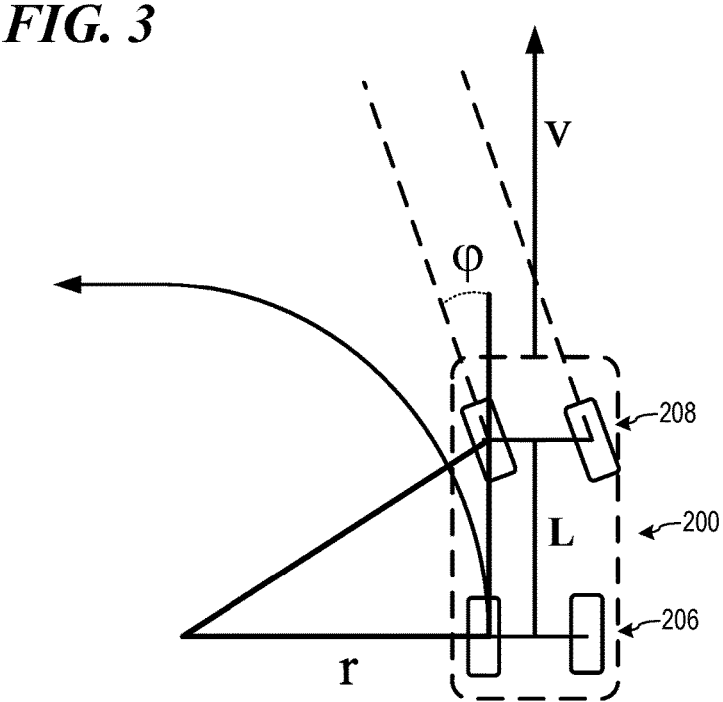
FIG. 3 illustrates a steering angle as applied to a land-based, surface model vehicle.

Turning now to FIG. 1, the reference numeral 100 generally indicates a standard RC Controller used for surface model vehicles, such as model cars and model trucks, for example. The RC Controller may have a least a steering wheel 102 and a throttle trigger 104. The RC Controller may also have a housing 106, which may include a hand-grip handle 108 for grasping the RC Controller. The RC Driver may use the standard surface RC Controller 100, as shown in FIG. 1, to control a vehicle 200. The RC Driver may command steering input using the steering wheel 102. The RC Controller 100 may transmit the RC Driver's commands to an RC Receiver 202 in the model vehicle 200 being controlled. With no electronic steering stability, the RC Receiver 202 may command a Steering Servo to a corresponding steering angle to steer the front wheels of the model vehicle 200. This is illustrated in FIG. 2 with respect to the RC steering wheel 102 showing a steering angle θ, and in FIG. 3 with respect to the steering angle φ as applied to land-based vehicle 200. As shown in FIG. 3, a land-based, ground model vehicle 200 is illustrated as performing a turn. The ground model vehicle 200 may comprise non-steerable wheels 206 and may also comprise steerable wheels 208. The non-steerable wheels 202 and the steerable wheels 208 may be spaced apart by a wheelbase distance L. The ground model vehicle 200 may be travelling in a forward direction at a speed v. In response to an RC Driver's commands, the ground model vehicle 200 may steer the steerable wheels 208 at a steering angle φ and execute a turn having a radius r. With electronic steering stability, the RC Receiver 202 may execute a control system, and may command the Steering Servo with the calculated command to control, in the example shown, the Yaw rate to the Driver's commanded rate. Further details of the RC controller 100 and the RC Receiver 202 are illustrated in and described with reference to FIG. 6.

Different vehicles may have different dynamic operation and responses and therefore may require different Electronic Steering Stability (ESS) system "settings". The "settings" may be different "gains", or different "coefficients" used with the control system algorithms. "Settings" may specify a completely different control algorithm may be used. For example, vehicle A may be controlled adequately with a "P" control algorithm, while vehicle B may require a complete "PID" control algorithm to be implemented.

Figure 4A:
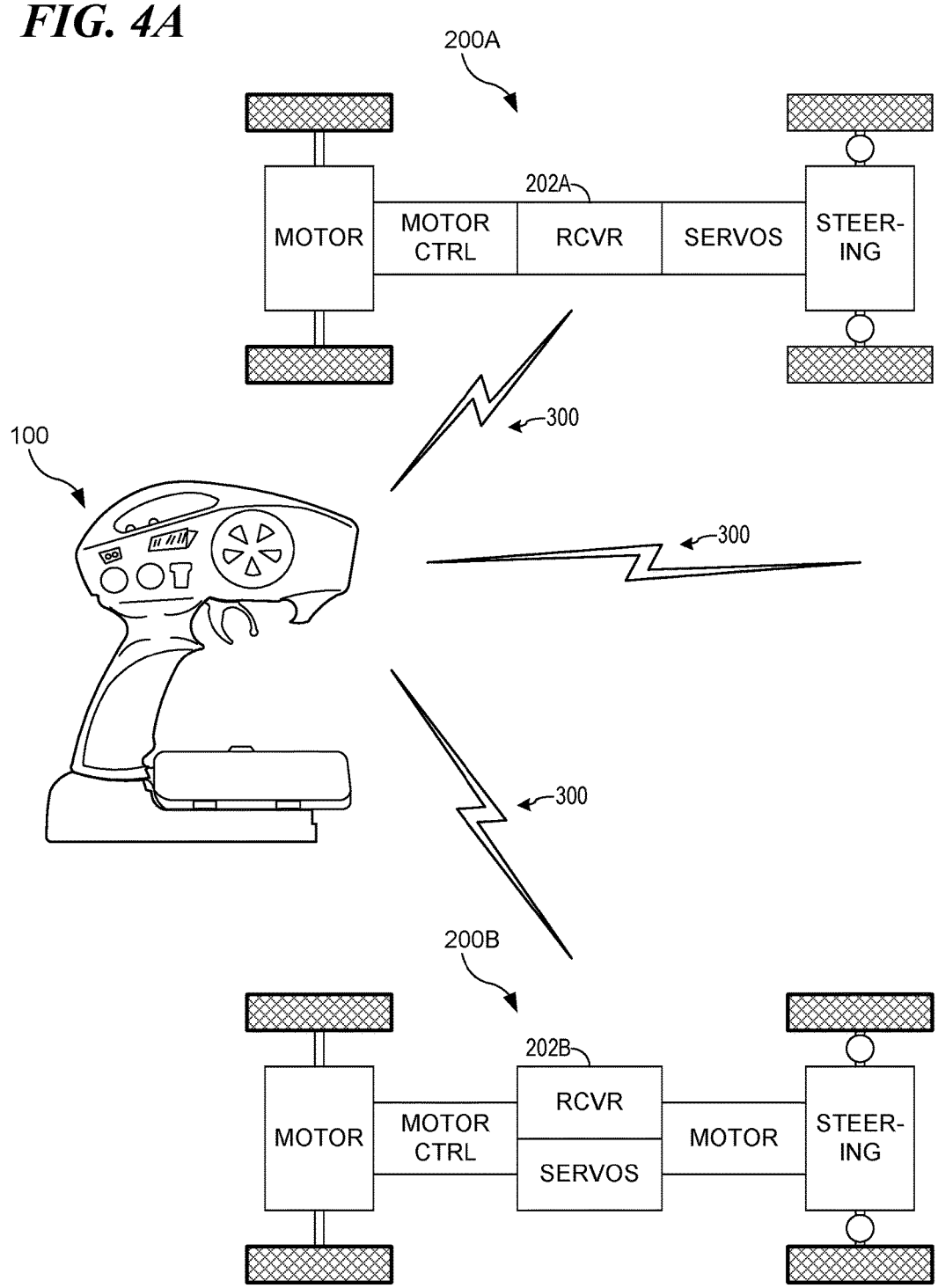
FIG. 4A is a block diagram of an RC Controller and RC model vehicle system.
Figure 6:
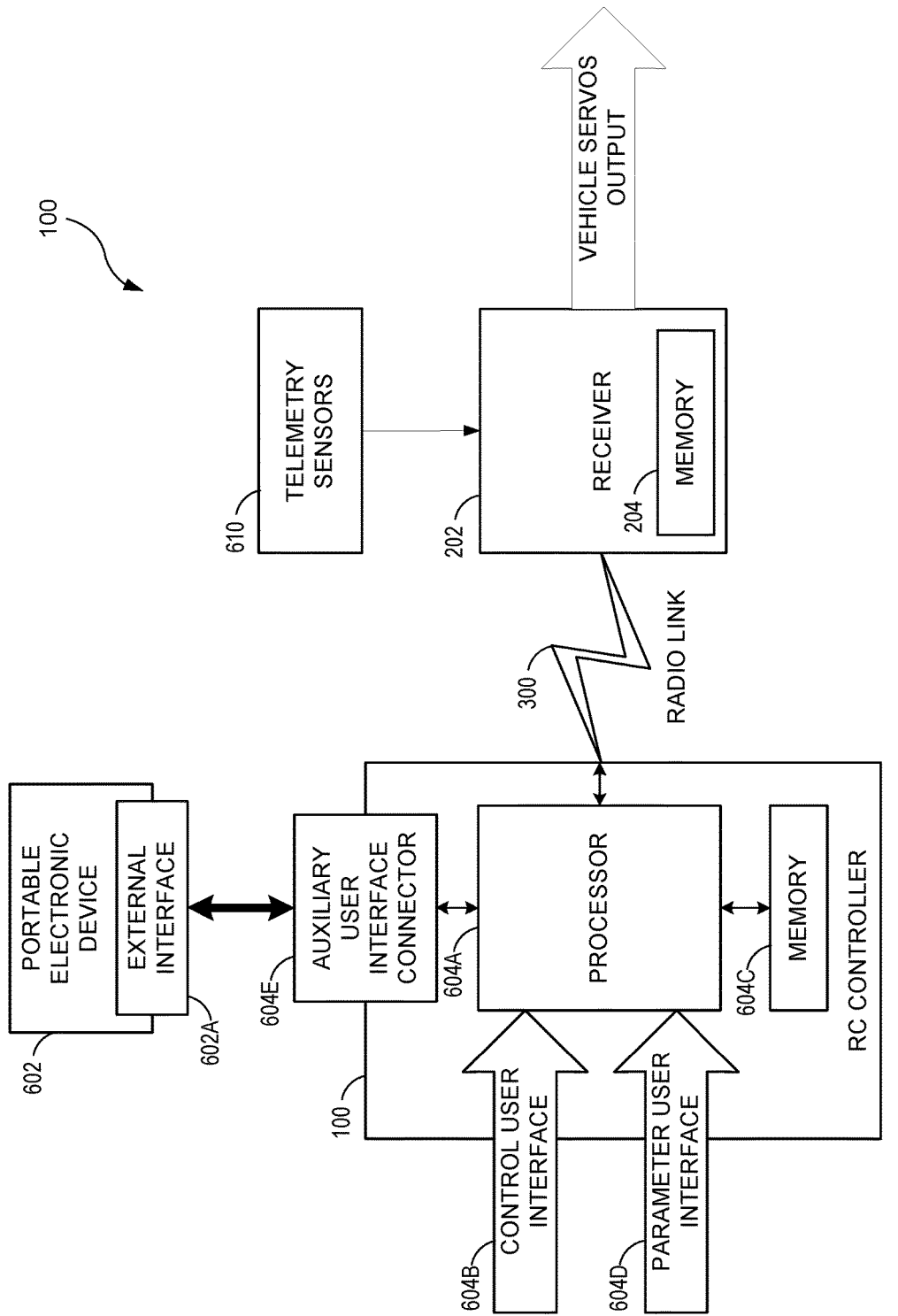
FIG. 6 is a block diagram of an RC controller, a receiver, and a radio link.

Turning now to FIG. 4A, two model vehicles 200A and 200B are shown interconnected by a radio control link 300. Vehicle A, 200A, may be a two-wheel drive model vehicle, for example, while vehicle B, 200B, may be a four-wheel drive model vehicle, for example, each having different dynamic operation and responses. The receiver 202A, of vehicle A, may have a vehicle identifier, a VID, associated with vehicle A. The receiver 202A may have a database of settings for a plurality of vehicles, including at least vehicle A and vehicle B, stored in memory 204 (FIG. 6). During operation the receiver 202A may be automatically configured with the settings associated with vehicle A by selecting the settings associated with the VID of receiver 202A. The ESS system operating in the model vehicle's receiver 202A may recognize vehicle A and automatically choose the correct algorithm and/or parameters associated with vehicle A. The ESS system operating in the model vehicle's receiver 202B may recognize vehicle B and automatically choose the correct algorithm and/or parameters associated with vehicle B. In an embodiment, the ESS system operating in a model vehicle's receiver 202 may load the settings associated with the VID of the receiver 202 from receiver memory 204 (FIG. 6). In an embodiment, the ESS system operating in a model vehicle's receiver 202 may download the settings associated with the VID of the receiver 202 from RC Controller 100.

Figure 4B:
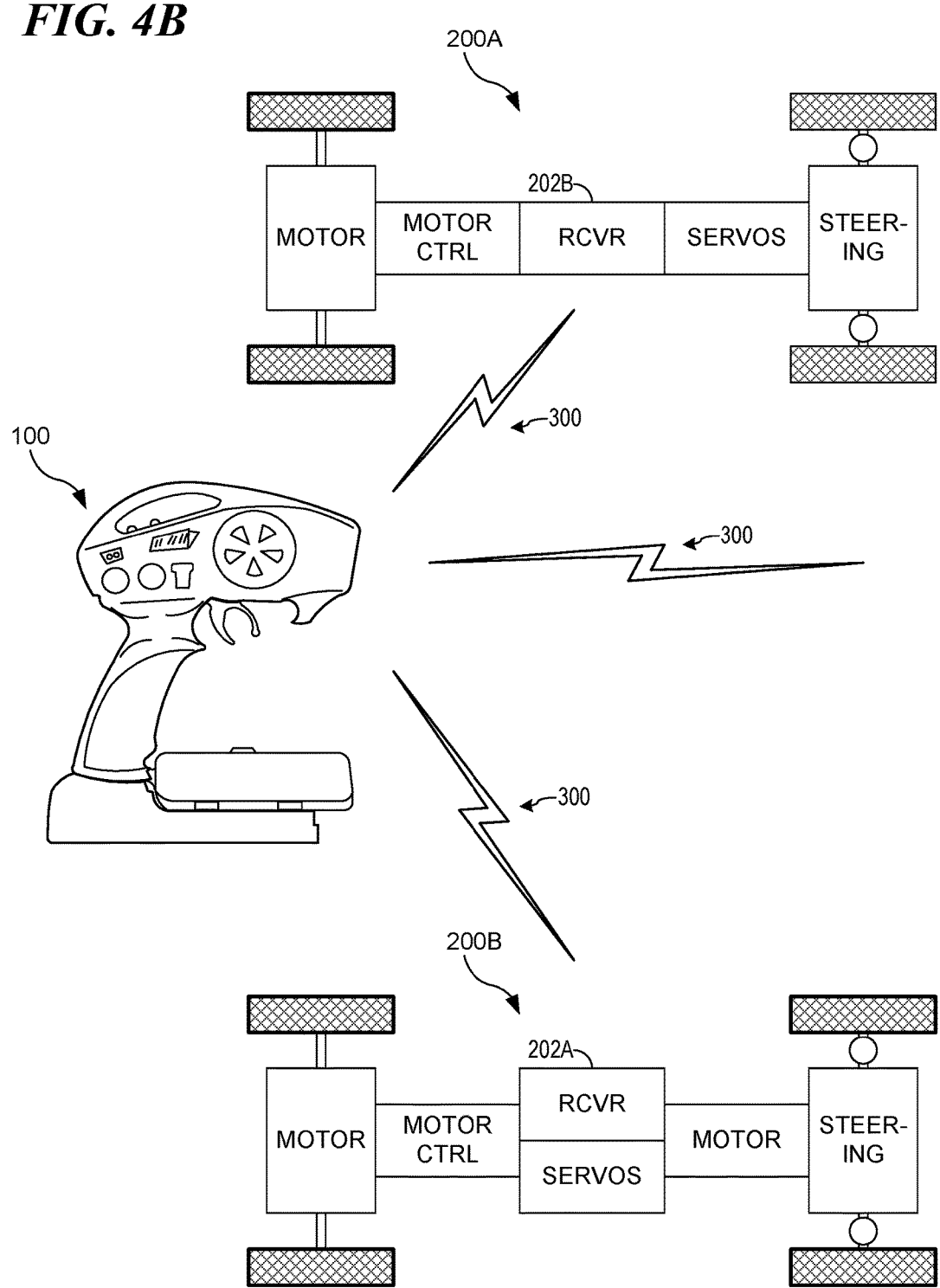
FIG. 4B is a block diagram of an RC Controller and RC model vehicle system.

Turning now to FIG. 4B, the receiver 202A from vehicle A has been removed from vehicle A and installed in vehicle B. The receiver 202B from vehicle B has been removed and installed in vehicle A. In this situation, the ESS settings must be manually updated on each receiver so the correct settings are chosen for each vehicle. An RC Controller 100 may establish a radio link with one of two, or more, RC model vehicles 200. In an embodiment, the RC Controller 100 may be functionally coupled to a multi-function electronic device (MFED) as described in U.S. Patent Publication No. U.S. 2015/00152375 by Jenkins, the entire contents of which are incorporated herein by reference. The MFED may also be referred to as a Portable Electronic Device which may connect to the RC Controller 100 using an Auxiliary User Interface as described in U.S. Patent Publication No. U.S. 2011/0275274A1 by DeWitt, et al., the entire contents of which are incorporated herein by reference.

To manually update a receiver, its internal vehicle identifier, or VID, may be changed. In an embodiment, the user may select the correct vehicle using the Portable Electronic Device described above. In an embodiment the user may select the correct vehicle using control features of the RC Controller 100. For example, the receiver of 202B, now installed in Vehicle A, may be changed so its VID is that associated with Vehicle A. While the RC Controller 100 is linked with receiver 202B, the user may select Vehicle A. Once Vehicle A is selected, RC Controller 100 may send a message to receiver 202B telling receiver 202B to change its VID from that associated with Vehicle B to that associated with Vehicle A. Receiver 202B may then load the appropriate ESS settings for Vehicle A from the database contained within memory 204 of receiver 202B.

The ESS system operating in the RC Receiver 202 may utilize certain "gains" and/or "coefficients" together with the control system algorithms for stabilizing the steering response. These ESS settings, or parameters, may be utilized in the ESS system operating in the RC Controller. Some of the parameters that may be loaded into the appropriate RC Receiver 202 may include, but are not limited to, the following:

Two or more numbers that map to PID Controller Gains, where each number may be associated with a different vehicle setting;

Accelerometer zeros, indicating tilt placement of the RC Receiver 202 in the chassis, where each accelerometer zero may be associated with a different vehicle setting;

Reverse Type, where each Reverse Type, such as "Nitro" or "Electric", may be associated with a different vehicle setting;

Compensator on/off, where each compensator, such as a "lag" compensator, may be associated with a different vehicle setting; and RC Controller identifier (ID) to link with, where each RC Controller identifier may be associated with a different vehicle identifier (VID) setting.

Figure 5:
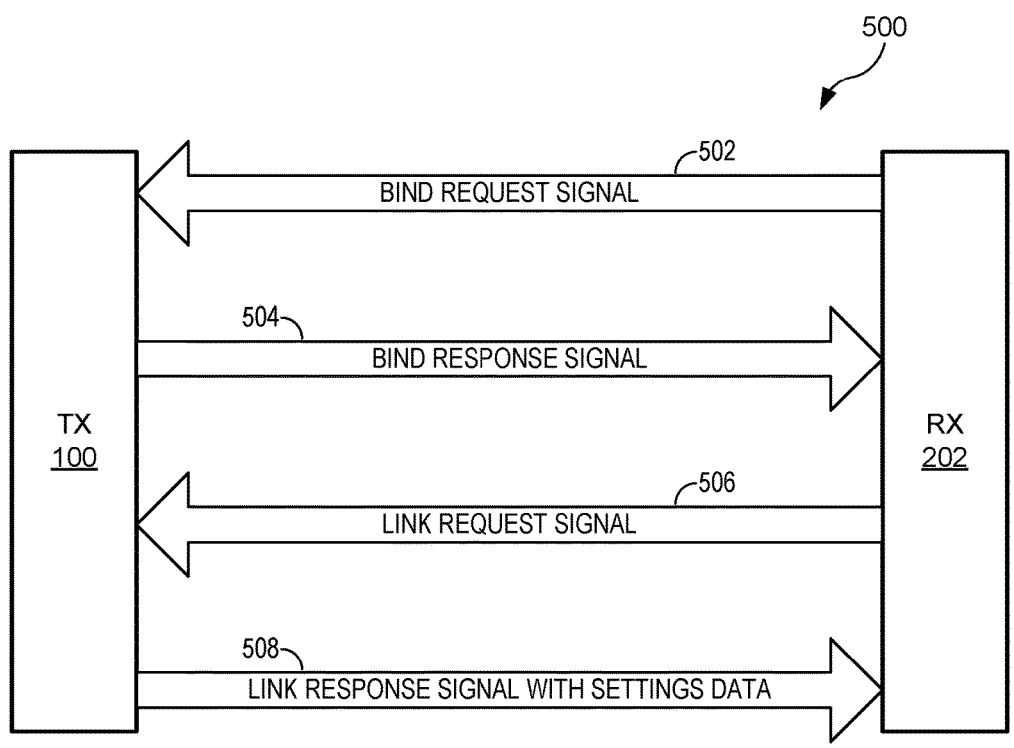
FIG. 5 is a signal diagram illustrating electronic messages passed between an RC Controller (TX) and an RC Receiver (RX) for binding and linking.

Turning now to FIG. 5, certain messages may be transmitted electronically between the RC Controller 100 and a RC model vehicle 200 via its Receiver 202. One such method is described in U.S. Patent Application Publication No. US-2011-0057778A1 to DeWitt, et al., the entire contents of which are incorporated herein by reference. As shown in FIG. 5, a receiver 202 may send a Bind Request Signal 502 to the RC Controller 100. The RC Controller 100 may send a Bind Response Signal 504 to receiver 202. The receiver 202 may send a Link Request Signal 506 to RC Controller 100. The RC Controller 100 may send a Link Response Signal With Settings Data 508 to RC Controller 100. These messages may be used to establish a link between RC Controller 100 and receiver 202, and in some embodiments to configure the subsystems of RC model vehicle 200 depending upon the dynamic operation and responses of the RC model vehicle 200.

Turning now to FIG. 6, an RC controller 100, and a receiver 202 are shown in accordance with an exemplary embodiment of the present invention. The RC controller 100 and receiver 202 may be in radio communication through radio link 300. Despite their names, both RC controller 100 and receiver 202 may be capable of both transmitting and receiving radio communications. Thus, RC controller 100 and receiver 202 may each be called a "transceiver," but to distinguish between the two devices the terms "RC controller 100" and "receiver 202" will be used.

A portable electronic device 602 may be a smart phone or digital music player, for example. Exemplary portable electronic devices are the iPhone and iPod Touch produced by Apple Inc. Both of these exemplary portable electronic devices may accept user input via a touch screen. Portable electronic device 602 may be connected to RC controller 100 through external interface 602A of portable electronic device 602. External interface 602A may be a conventional hardware interface of portable electronic device 602, such as the connection used by portable electronic device 602 to communicate with a personal computer.

Portable electronic device 602 may execute a software application for communication with RC controller 100. The software application may be provided to portable electronic device 602 through an Internet download. Internet download is a common software application delivery method for many portable electronic devices.

RC controller 100 may have processor 604A. Processor 604A may determine what output signal is transmitted to receiver 202 over radio link 300. The output signal may be determined from user input from control user interface 604B and one or more parameters stored in memory 604C. Control user interface 604B may be components of RC controller 100 which permit a user to directly control the operations of a ground model vehicle. These components may include a steering wheel 102 and throttle trigger 104. Once processor 604A determines the output signal that should be transmitted, it may send the signal via radio control link 300.

The user may modify the parameters in memory 604C through parameter user interface 604D. Parameter interface 604D may allow the user to modify basic parameters such as servo reversing, steering sensitivity, and throttle sensitivity. These basic parameters may be sufficient for the user to operate the model vehicle, but may be limited by the input and output capabilities of parameter interface 604D.

Receiver 202 may be provided with a memory 204 for storing settings which may be one or more parameters sent from RC controller 100 via radio control link 300. Telemetry sensors 610 may provide indications of the dynamic conditions of the model ground vehicle to receiver 202 for feedback to the RC Driver.

Figure 7:
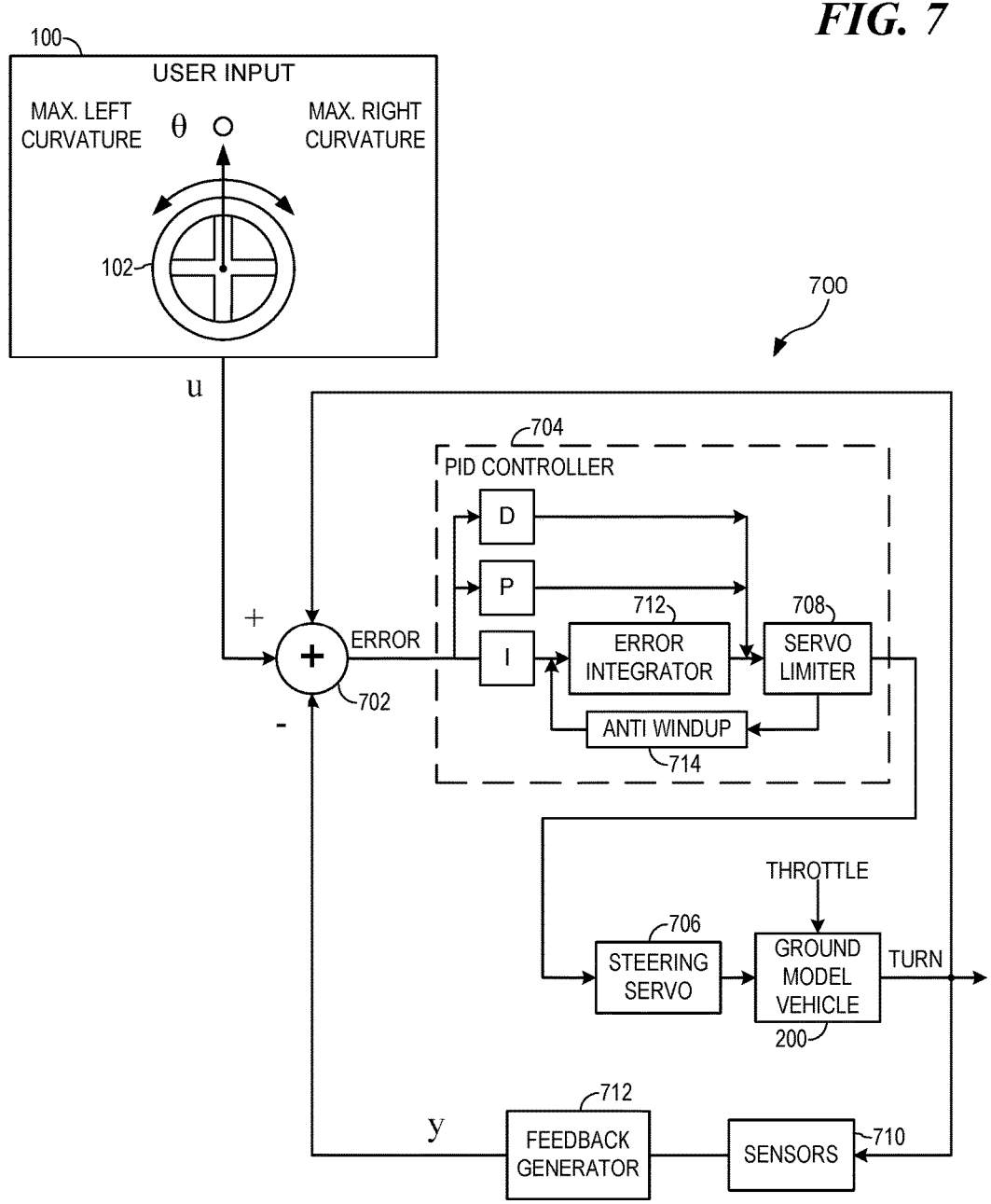
FIG. 7 is a block diagram of a curvature controller.

Turning now to FIG. 7, the RC Controller 100 may generate user input u by turning steering wheel 102. User input u may be fed to an input 702 of a control system 700. The control system 700 may have a PID Controller 704. The PID Controller 704 may incorporate an error integrator 712, a servo limiter 708, an anti-windup circuit 714. The error integrator 712 and the anti-windup circuit 714 may be incorporated into the integral process I of the PID Controller 704. The integral process I, the proportional process P, and the differential process D may combine at servo limiter 708 for driving an input of steering servo 406, to command steering angle φ as shown in FIG. 2. The steering servo 406 may be a part of the CAR, or ground model vehicle 200. Together with the THROTTLE input commanding the speed v of CAR, or ground model vehicle 200, and actuation of steering servo 406 responding to user input u and commanding a steering angle φ, the CAR, or ground model vehicle 200, may execute a TURN.

The TURN may be detected by Sensors 710, which may be 6-axis MEMS devices having three axes of rate Gyros and three axes of Accelerometers. A speed sensor 410 may also be provided. Output values representing three axes of rate Gyro and three axes of Accelerometers may be fed into a feedback generator 712. The three axes of Gyros may be used to determine the attitude of the vehicle. The three axes of accelerometers may be used to determine the vector acceleration of the vehicle. The feedback generator 712 may provide a feedback output value y to input 702. The input 702 may generate an error value based upon user input u and feedback output value y, which may be fed into PID Controller 704 to further control steering of the car, or ground model vehicle 200.

Figure 8:
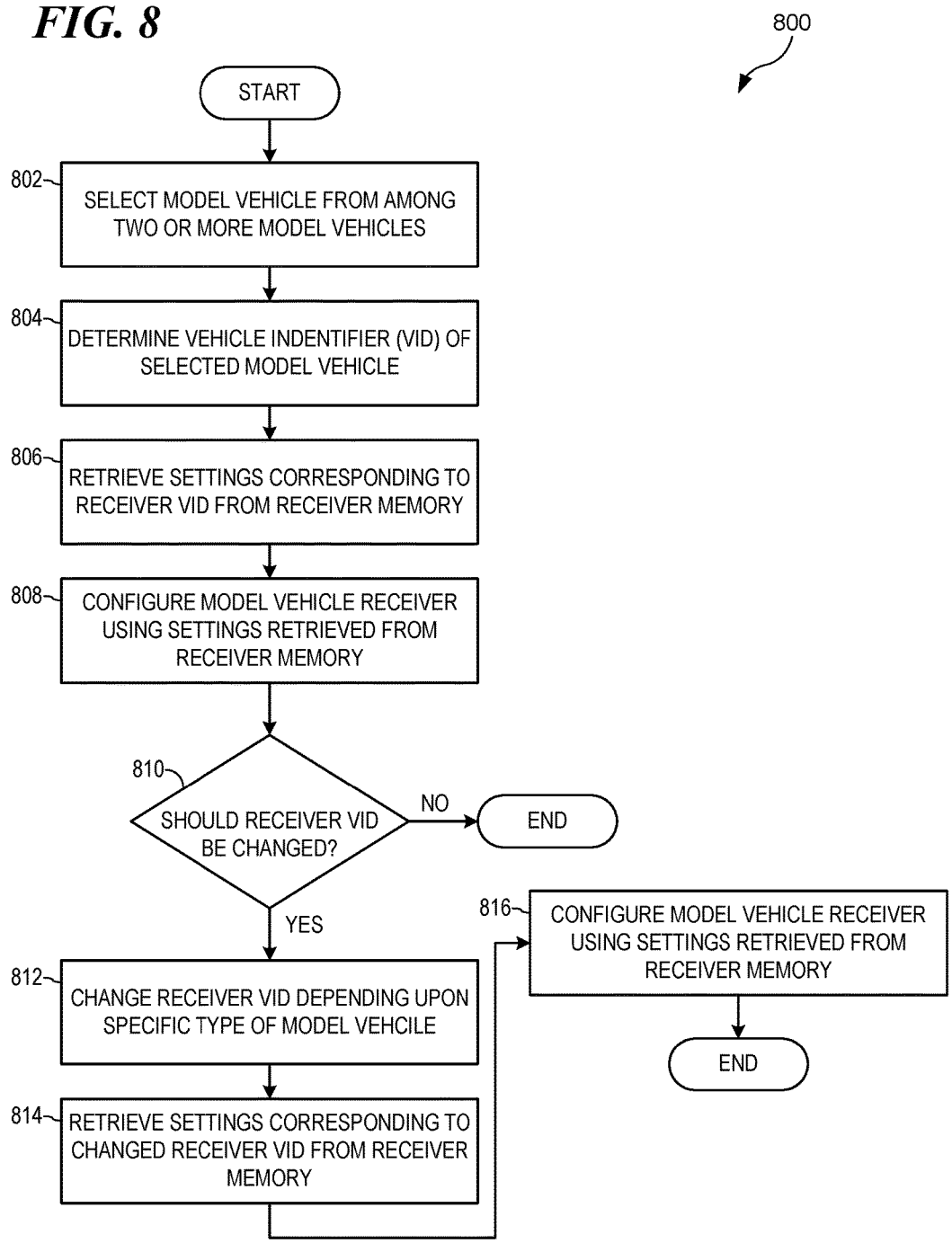
FIG. 8 is flow chart illustrating a process.

Turning now to FIG. 8, a method 800 for electronically loading settings in an RC Receiver for use in an electronic steering stabilization system for an RC model ground vehicle is shown. The method 800 may begin at step 802, wherein a user may select a certain model vehicle from among two or more model vehicles. In step 804, the RC Receiver may determine its currently-assigned vehicle identifier (VID). In step 806, the RC Receiver may retrieve settings corresponding to the currently-assigned VID of the RC Receiver from receiver memory. In step 808, the RC Receiver may configure itself by loading the settings corresponding to the currently-assigned VID of the RC Receiver. In step 810, the user may determine whether the VID of the RC Receiver should be changed. If the VID need not be changed, the process for electronically loading settings in an RC Receiver for use in an electronic steering stabilization system for an RC model ground vehicle ends. Normal operation of the model vehicle may resume. If, in step 810, the user determines the VID of the RC Receiver should be changed, then in step 812 the user may change the VID of the RC Receiver. The changed VID may preferably correspond to a particular model vehicle in which the RC Receiver has been installed. In step 814, the RC Receiver may retrieve settings corresponding to the changed VID of the RC Receiver from receiver memory. In step 816, the RC Receiver may configure itself by loading the settings corresponding to the changed VID of the RC Receiver, after which the process for electronically loading settings in an RC Receiver for use in an electronic steering stabilization system for an RC model ground vehicle ends, and normal operation of the model vehicle may resume. Having thus described the present invention by reference to certain of its exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of exemplary embodiments. Accordingly, it is appropriate that any claims supported by this description be construed broadly and in a manner consistent with the scope of the invention.

The invention claimed is:

1. An electronic steering stabilization (ESS) system for a model ground vehicle, the ESS system comprising:
   a controller comprising a transmitter configured to transmit control signals to the model ground vehicle, wherein the transmitter comprises:
      a steering control for steering the model ground vehicle;
      a throttle control for controlling speed and forward/reverse direction of the model ground vehicle; and
      a transmitter memory for storing settings associated with the model ground vehicle;
   a receiver configured to receive control signals from the transmitter, wherein the receiver comprises a receiver memory for storing the settings associated with the model ground vehicle;
   wherein one of the settings comprises data representing the physical orientation of the receiver in the model ground vehicle;
   wherein the transmitter is configured to transmit the settings stored in the transmitter memory to the receiver; and
   wherein the receiver is configured to store the settings in the receiver memory, and then loads the ESS system with appropriate parameters from the settings in the receiver memory.

2. The system of claim 1, wherein one of the settings comprises gain values.

3. The system of claim 1, wherein one of the settings comprises one or more coefficients in an algorithm.

4. The system of claim 1, wherein one of the settings comprises accelerometer zeros, indicating tilt placement of the receiver in the model ground vehicle.

5. The system of claim 1, wherein one of the settings comprises data representing a type of reverse behavior.

6. The system of claim 1, further comprising a compensator operatively connected to the model ground vehicle, wherein one of the settings comprises data representing an on or off state of the compensator.

7. The system of claim 1, wherein one of the settings comprises data identifying the controller to link with.

8. The system of claim 1, wherein one of the settings comprises an algorithm.

9. The system of claim 1, wherein one of the settings comprises a receiver vehicle identifier (VID).

10. The system of claim 9, wherein the appropriate parameters loaded by the receiver comprise an algorithm corresponding to the VID and selected from a plurality of algorithms stored in the receiver memory.

11. The system of claim 9, wherein the appropriate parameters loaded by the receiver comprise settings corresponding to the VID and selected from a plurality of settings stored in the receiver memory.

12. A method for electronically loading parameters in an electronic steering stabilization (ESS) system for a model ground vehicle, the method comprising:
   reading a vehicle identifier (VID) from a receiver in the model ground vehicle;
   automatically configuring the model ground vehicle via the receiver loading parameters into the ESS system corresponding to settings associated with the VID from a plurality of settings stored in receiver memory; and
   wherein one of the settings comprises accelerometer zeros, indicating tilt placement of the receiver in the model ground vehicle.

13. The method of claim 12, further comprising the steps of:
   changing the VID of the receiver to a different vehicle identifier (VID); and
   automatically configuring the model vehicle via the receiver loading parameters into the ESS system corresponding to settings associated with the different VID from the plurality of settings stored in receiver memory.

14. An electronic steering stabilization (ESS) system for a model ground vehicle, the ESS system comprising:
   a controller comprising a transmitter configured to transmit control signals to the model ground vehicle, wherein the transmitter comprises:
      a steering control for steering the model ground vehicle;
      a throttle control for controlling speed and forward/reverse direction of the model ground vehicle; and
      a transmitter memory for storing settings associated with the model ground vehicle;
   a receiver configured to receive control signals from the transmitter, wherein the receiver comprises a receiver memory for storing the settings associated with the model ground vehicle;
   a compensator operatively connected to the model ground vehicle;
   wherein one of the settings comprises data representing an on or off state of the compensator;
   wherein the transmitter is configured to transmit the settings stored in the transmitter memory to the receiver; and
   wherein the receiver is configured to store the settings in the receiver memory, and then loads the ESS system with appropriate parameters from the settings in the receiver memory.

15. The system of claim 14, wherein one of the settings comprises a receiver vehicle identifier (VID).

16. The system of claim 14, wherein the appropriate parameters loaded by the receiver comprise an algorithm corresponding to the VID and selected from a plurality of algorithms stored in the receiver memory.

17. The system of claim 14, wherein the appropriate parameters loaded by the receiver comprise settings corresponding to the VID and selected from a plurality of settings stored in the receiver memory.

18. The system of claim 14, wherein one of the settings comprises gain values.

19. The system of claim 14, wherein one of the settings comprises one or more coefficients in an algorithm.

20. The system of claim 14, wherein one of the settings comprises data representing a type of reverse behavior.

* * * * *